United States Patent
Monjo

[11] Patent Number: 5,809,470
[45] Date of Patent: Sep. 15, 1998

[54] PROGRAMMABLE MESSAGE EMITTING SIGNAL RECEIVING/TRANSMITTING GARMENT HANGER

[76] Inventor: Nicolas Monjo, 512 E. 88th St., New York, N.Y. 10128

[21] Appl. No.: 641,889

[22] Filed: May 2, 1996

[51] Int. Cl.⁶ .............................. G10L 9/18; A47G 25/02
[52] U.S. Cl. .............................................. 704/272; 223/85
[58] Field of Search ............................. 395/2.81; 223/85; 704/272

[56] References Cited

U.S. PATENT DOCUMENTS

| | | | |
|---|---|---|---|
| 4,679,340 | 7/1987 | Johansson | 40/322 |
| 4,886,010 | 12/1989 | Stutzman | 116/308 |
| 5,056,694 | 10/1991 | Michalik | 223/98 |
| 5,365,494 | 11/1994 | Lynch | 368/10 |
| 5,406,024 | 4/1995 | Kazuaki | 84/622 |
| 5,410,962 | 5/1995 | Collier | 101/375 |
| 5,441,158 | 8/1995 | Skinner | 209/583 |
| 5,463,369 | 10/1995 | Lamping | 280/808 |
| 5,504,836 | 4/1996 | Loudermilk | 704/272 |

Primary Examiner—David R. Hudspeth
Assistant Examiner—Tálivaldis Ivars Šmits
Attorney, Agent, or Firm—William D. Schmidt

[57] ABSTRACT

An electronic sound generating message emitting circuitry with message storing on a programmable computer chip mounted to a garment hanger. The sound emitting circuitry comprising an electronic circuit which includes a sound synthesizer, sound producing means and a power supply coupled together for emitting pre-stored messages from a programmed synthesizer chip. A radio signal receiver and transmitter coupled together for transmitting stored messages from the programmable computer chip to a main computer upon receiving an activation signal. Information such as delivery date, price, etc. can be transmitted making receiving of goods and inventory faster and less expensive. The message emitted can be used as a form of direct advertisement emitting sales messages upon pressing of a button or upon vibrations produced by movement of the hanger. The garment hanger can be reused since the computer chip is programmable and the synthesizer chip in the sound producing means is replaceable.

13 Claims, 6 Drawing Sheets

PROGRAMMABLE MESSAGE EMITTING SIGNAL RECEIVING/TRANSMITTING GARMENT HANGER

FIELD OF INVENTION

The invention relates to a message emitting electronic signal receiving/transmitting garment hanger with programmable memory computer chip.

DESCRIPTION OF THE PRIOR ART

Messaging electronic data recording devices having the ability to store, recall, edit and emit related data are well known as application-specific adaption of computers ruining Database Management Systems (DBMS) software. Such devices are typically directed at very specific and narrowly defined applications such as electronic organizers and electronic voice boxes. This application-driven characteristic has yet to be used on garment hangers to store such information as price, lot number, price changes as well as other related information.

The present invention also relates to a message emitting device having sound emitting circuitry mounted to the garment hanger and coupled to the messaging electronic data recording device. This message emitting device will be able to emit pre-stored messages upon activation of the sound emitting circuitry. The sound emitting circuitry in conjunction with the electronic data recording device has yet to be used on garment hangers.

The present invention also relates to a radio signal receiver and transmitter which will transmit stored data upon activation by a designated wavelength signal. This radio signal receiver/transmitter is well known in the art but has yet to be used on garment hangers in conjunction with an electronic data recording device and message emitting device.

SUMMARY OF THE INVENTION

An object of the invention is to provide pre-programmed audio messages upon activation of an activator switch. The messages are pre-programmed on the synthesizing chip located in the sound emitting circuitry. These messages might pertain to the garment on the hanger or other garments available in the store. Such information could include stock number, price, marked down price or suggestions on wearing the item. The stored information could be used to advertise the garment or other items in the same line of clothes.

A second object of the invention is to have pertinent pricing and stock information stored in the electronic data recording device. This device includes a programmable computer chip separate from the synthesizer chip of the sound producing means. This information can be relayed to a main terminal computer when the proper signal sent to the hanger is received and subsequently activates the electronic circuity. The information would be transmitted directly to the main computer which will make repricing and inventory possible without manually affixing or counting items.

A third object of the invention is to provide a garment history stored on the electronic data recording device upon manual activation. This information would identify the item on the hanger and give all the pertinent data needed for cashing out the item. This feature would help eliminate mis-pricing due to lost or removed tickets.

A fourth object of the invention is to announce audio messages to the consumer upon activation of the activator switch. The activator switch can be activated by pressing it or by the vibrations associated with the movement of the hanger. This would aid in advertisement of the garment on the hanger or promote the sale of other items in the store. This form of direct advertisement would be inexpensive and effective.

A fifth object of the invention is to emit specific perfumes to the consumer upon activation of the activator switch. The activator switch can be activated by pressing it or by the vibrations associated with the movement of the hanger. Upon activation an aspirator would emit the pre-loaded perfume. This perfume could be a scent manufactured by the same designer or the perfume of another manufacturers available in the store. This as well can be used as an inexpensive mode of direct advertising.

The sixth object of the invention is the ability for the garment hanger to be used with different garments once the original one is removed. This is possible due to the programmable computer chip in the memory circuitry and the ability to replace the pre-programmed synthesizer chip of the sound producing means. This allows for the new inventory data to be loaded on the computer chip and new messages to be emitted that are consistent with the new garment. These features enable the hanger to be reused making the garment hanger even more economical.

The seventh object of the invention is the security proof characteristic by equipping the garment hanger with a permanent standard store alarm device so that it prevents the hanger from leaving the store premises.

DESCRIPTION OF THE PREFERRED EMBODIMENTS

Figure 1A:
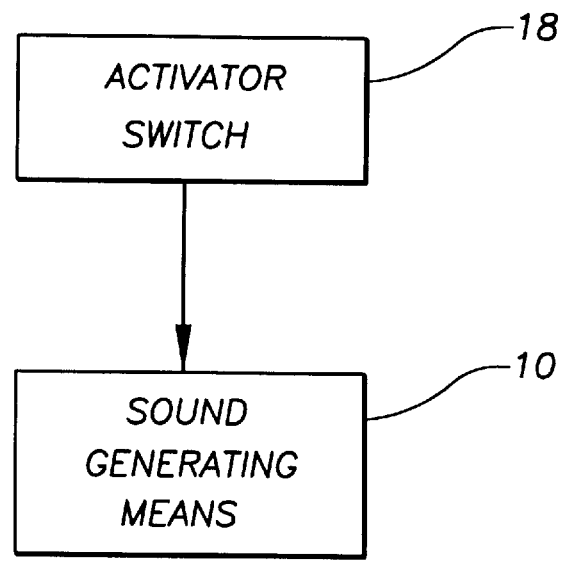
FIG. 1A is a block diagram schematically showing the structure of an electronic sound generating apparatus of the present invention.

Referring now to the drawing in great details, there is shown in FIG. 1A a block diagram schematically showing the structure of an electronic sound generating apparatus of the invention. The sound generating apparatus is connected to an activator switch in series. Upon activation of the switch the sound generating circuitry will emit preprogrammed messages.

Figure 1B:
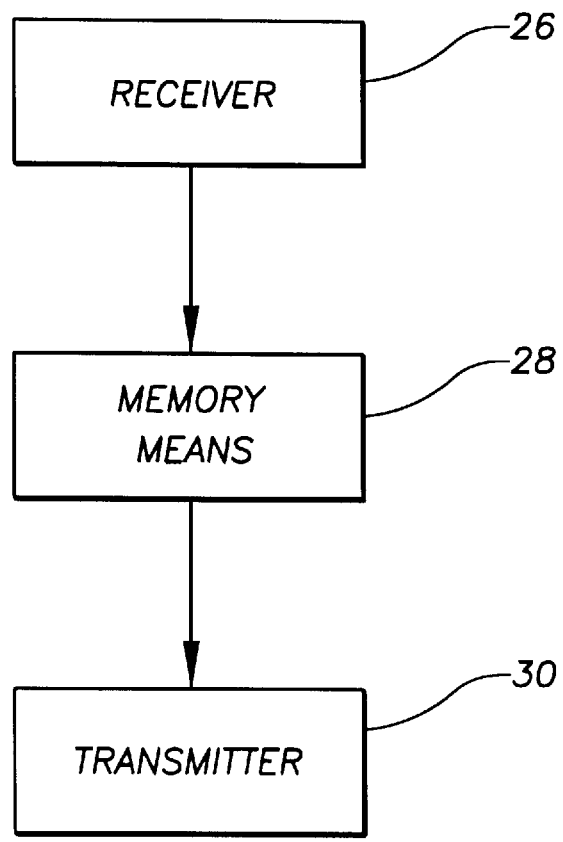
FIG. 1B is a block diagram schematically showing the structure of a signal receiver, memory means, and signal transmitting apparatus of the present invention.

FIG. 1B is a block diagram schematically showing the structure of the signal receiver which is connected to the programmable computer chip and signal transmitter in series. The computer chip circuitry sends information to the signal transmitter to be transmitted upon receiving an activation by a proper signal. Such information can include price markdowns, inventory information etc. This mode of transmitting information can reduce inventory cost.

According to the teachings of the present invention, an electronic sound producing circuit is mounted to a garment hanger. The circuit 10 includes a sound or speech synthesizer chip 12, a power supply of one or more batteries 14, a sound producing element 16, in this case, a speaker and a switch 18 for activating the electronic sound producing circuit 10. The sound or speech synthesizer chip 12 can be of the type which syntheses a melody or which synthesizes a voice message such as "this dress will look great for the spring". Also, of course other sales messages of general import can be pre-programmed into synthesizer chip 12.

Figure 2:
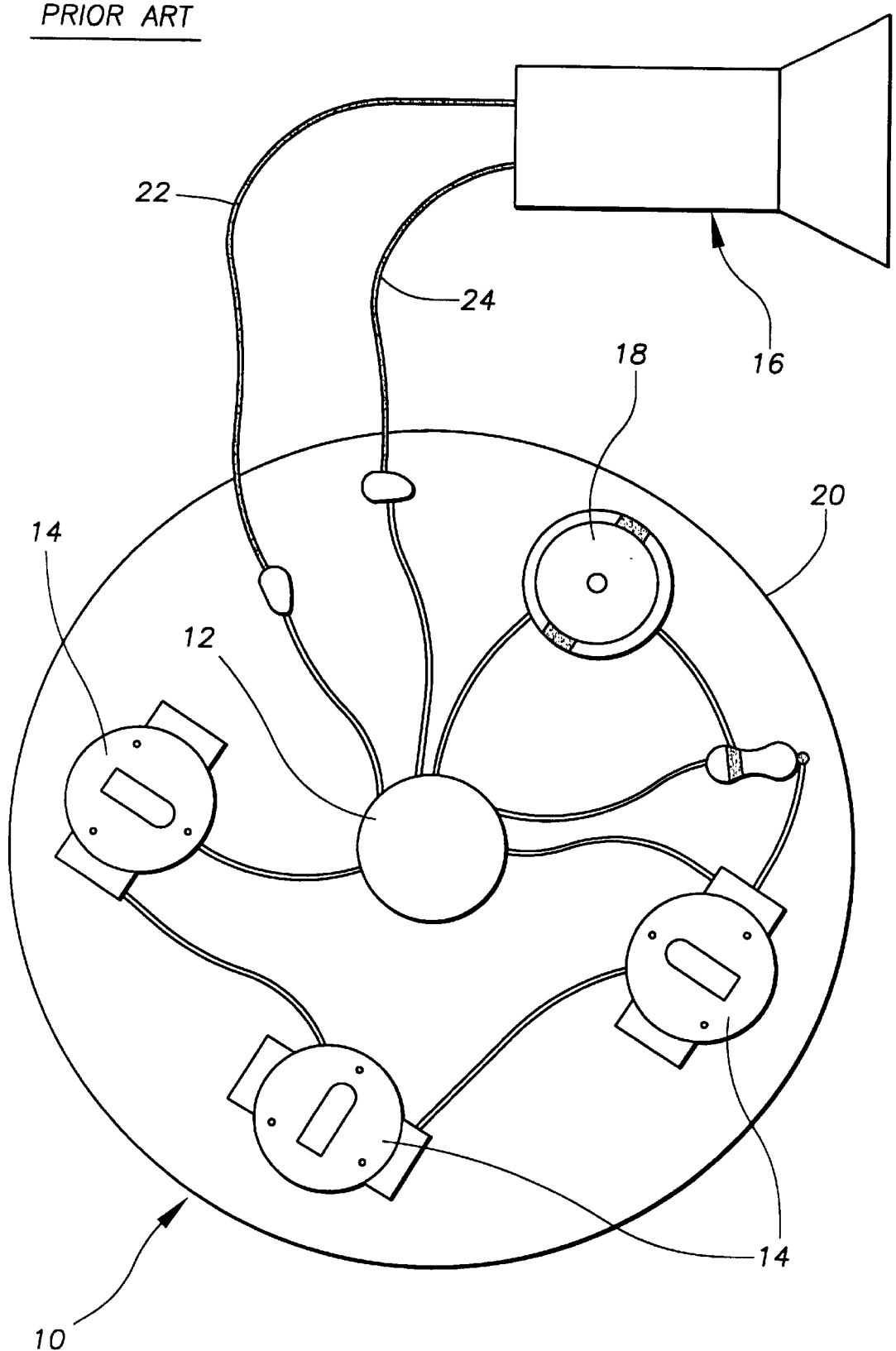
FIG. 2 is a plan view of another embodiment of circuit elements of the device where a circuit board with a speaker mounted on one portion of the hanger and a chip, batteries, and switch mounted on the circuit board coupled together.

FIG. 2 is a plan view of a circular electric circuit board for the electronic circuit 10. Here the speech or sound synthesizer chip 12 is mounted to the middle of the board 20, which is subsequently mounted to the garment hanger, the battery units 14 are mounted adjacent the periphery of the circuit board 20 and a diagram type switch 18 is mounted on the board 20 in the position shown. A speaker is mounted to the hanger adjacent to the circuit board 20 and connected by wires 22 and 24 to the rest of the circuit 10 mounted on the circular circuit board 20. Although this schematic shows a circular sound emitting circuitry other shapes can be used to adapt to garment shape and size.

Figure 3A:
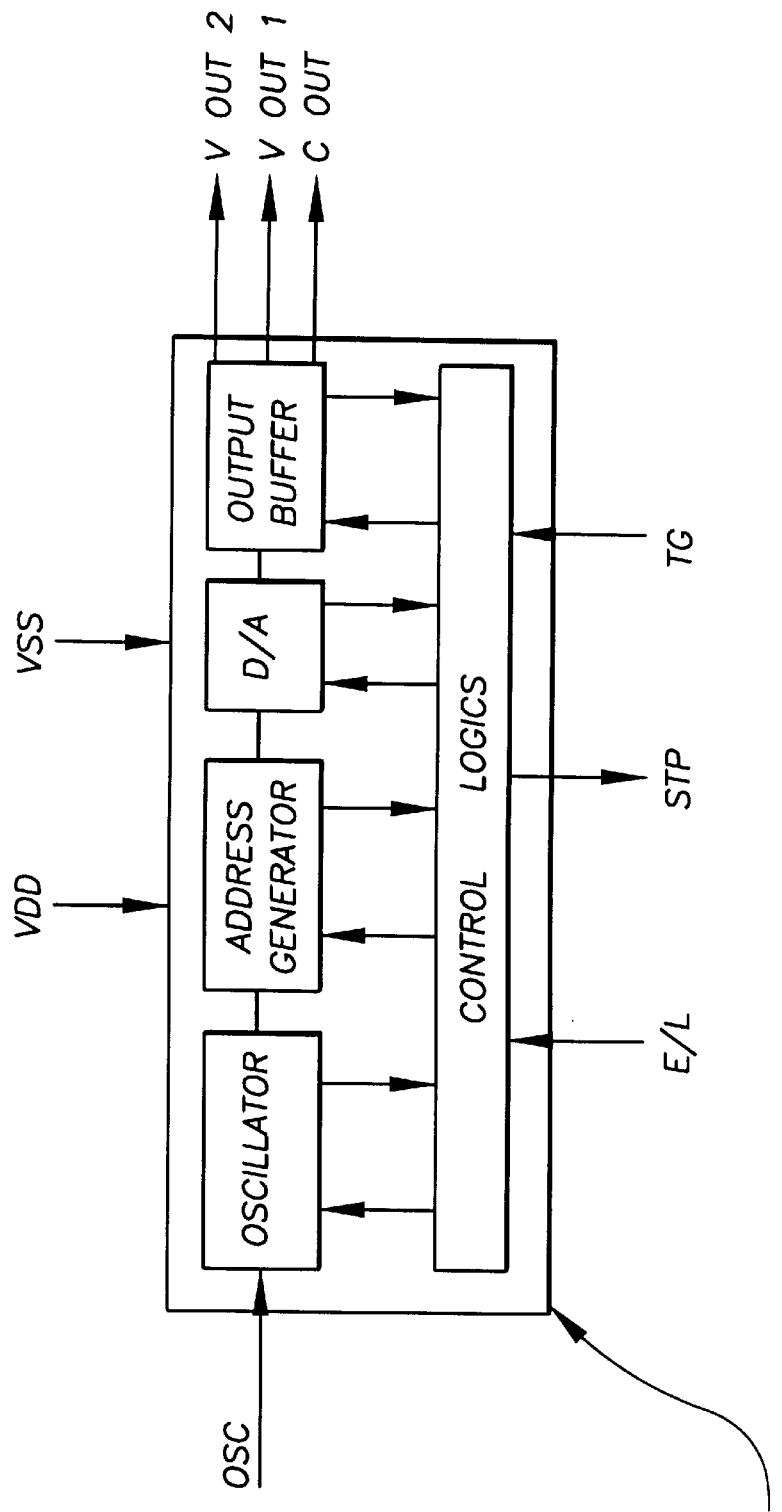
FIG. 3A is a circuit diagram of a speech synthesizing chip.

In FIG. 3A there is an illustrated a block electrical circuit diagram of the components of the speech synthesizer chip 12 which includes an oscillator, an address generator, a digital to analog converter, D/A, an output buffer circuit and control logic, eg. programmed computer chip, as well as input synthesizing CMOS VISI that can synthesize voice up to 2.8 seconds. The synthesizer chip 12 contains most of the necessary circuit elements described above so that it can apply to various voice systems with minimum external parts.

Another embodiment includes several chips cascaded to reach longer than 2.8 seconds voice durations. Customer speech data will be edited and programmed into PLAY by changing one mask during fabrication of the synthesizer chip 12.

Figure 3B:
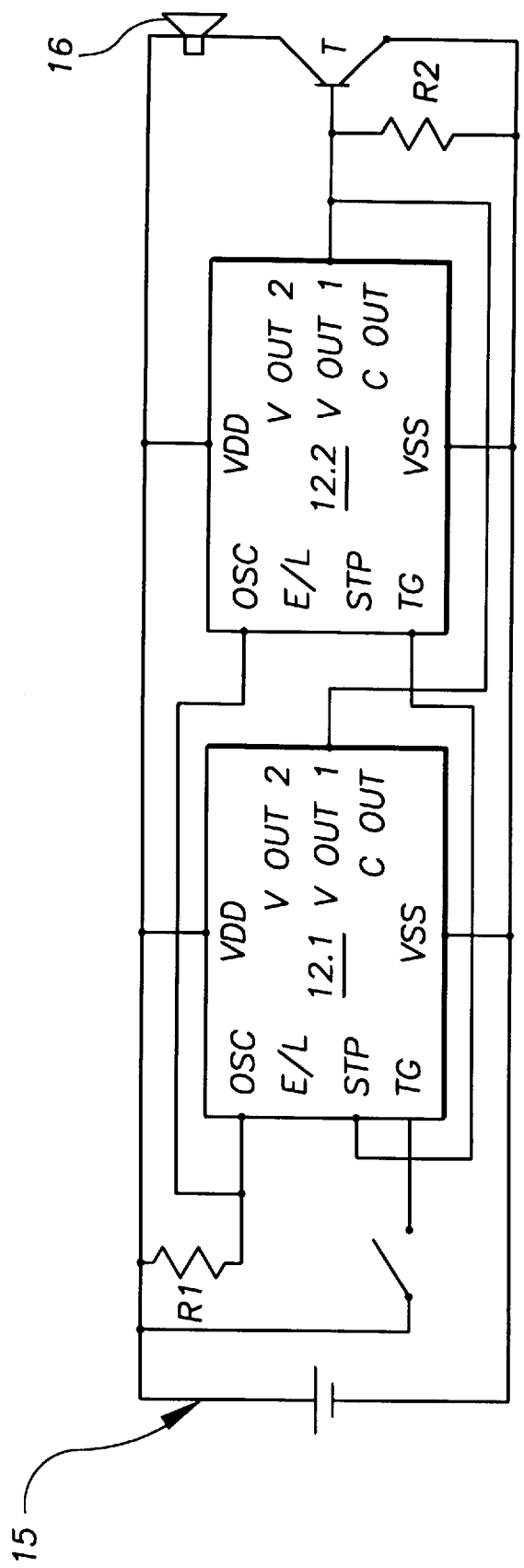
FIG. 3B is a block circuit diagram of a double or parallel chip circuit with an output speaker.

FIG. 3B illustrates another embodiment where two synthesizing chips 12.1 and 12.2 are connected in a cascade arrangement to extend desired voice sections in a cascade arrangement with the sound producing element connected to chips 12.1 and 12.2. Of course, synthesizer chips 12.1 and 12.2 can be connected in parallel to extend the desired voice sections in a parallel arrangement with the sound producing element.

Figure 3C:
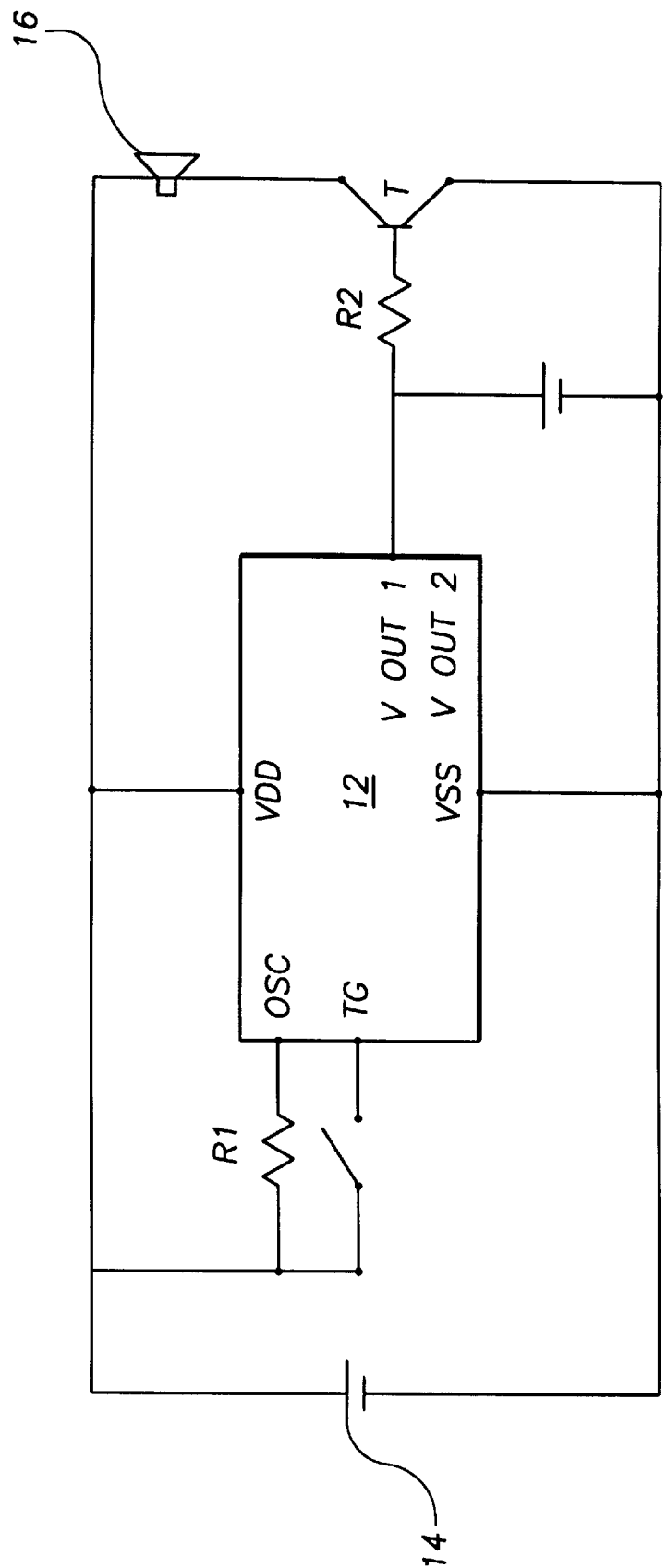
FIG. 3C is a block circuit diagram of a signal chip circuit with an output speaker.

FIG. 3C is another embodiment where one synthesizing chip 12 is connected in series with the sound producing element.

Figure 4:
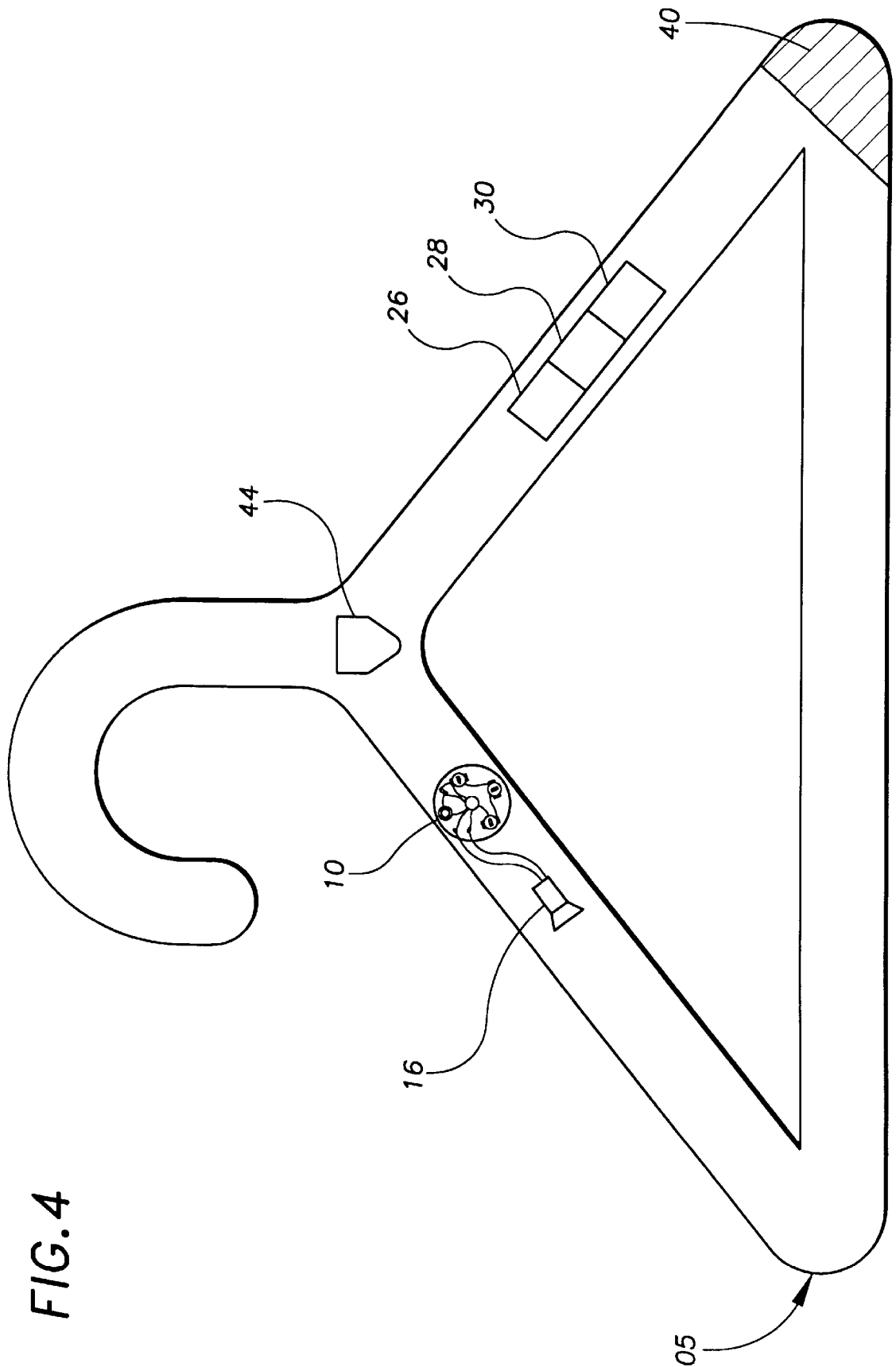
FIG. 4 is a plan view of the garment hanger having the features of the present invention.

Referring now to the garment hanger shown in FIG. 4 which has speaker 16, sound generating circuitry 10, connected in series. Signal receiver 26, programmable computer chip 28 and signal transmitter 30 connected in series. The hanger also is equipped with a standard store alarm strip 40 attached to garment hanger 05 to prevent the garment hanger from leaving the store improperly.

FIG. 4 is another embodiment of the invention that shows a garment hanger that includes a signal receiver 26 which is coupled to computer chip 28 loaded with programmed data. Once the signal receiver receives the proper signal it will send the programmed data from the computer chip to a signal transmitter 30 which is connected in series. The transmitter 30 will transmit the signal out to an awaiting external computer which will record all the incoming information. Standard micro signal receiver 26/transmitter 30 technology can be used. Data transmitted can include lot number, price, price reductions, etc., which will make inventory and price changes easier as well as less expensive.

The message emitting signal transmitting garment hanger 05 of the present invention has a number of advantages, some of which have been described above and others which are inherent in the invention. Also will be understood that modifications can be made to the message emitting signal transmitting garment hanger described above without departing from the teachings of the invention.

Wherefore having described the present invention, what is claimed is:

1. A programmable message emitting signal receiving/transmitting garment hanger comprising:
    a garment hanger for hanging garments on to display or store said garment on a garment rack,
    a memory means for storing information mounted to said garment hanger,
    a sound emitting means mounted to said garment hanger comprising an electronic circuit which includes a sound synthesizer, sound producing means and a power supply coupled together for emitting a message; and
    an activator switch mounted to said garment hanger for activating said electronic circuit of sound emitting means.

2. A device of claim 1 wherein said garment hanger has a signal receiver coupled to a programmable computer chip for activating output of select information on said programmable computer chip to a signal transmitter coupled to said signal receiver and said programmable computer chip for transmitting information from said programmable computer chip once activated by a signal of a determined wavelength.

3. A device of claim 2 wherein said sound synthesizer is a speech synthesizing chip.

4. A device of claim 3 further comprising a speech synthesizing chip comprises an oscillator, control and timing logic circuitry coupled to an address generator, a digital analog converter coupled to said logic circuitry, and an output buffer circuit coupled to said converter.

5. A device of claim 4 wherein two synthesizing chips are coupled in a cascade to increase the speech duration.

6. A device of claim 5 wherein a mercury switch means for activating said electronic circuit of sound emitting means is mounted to said garment hanger.

7. A device in claim 6 wherein a display means for displaying messages on said programmable computer chip mounted to said garment hanger.

8. A device of claim 7 wherein a perfume emitting means is coupled to said activator switch and emits a perfume when the activator is activated.

9. A device of claim 8 wherein a store alarm strip is attached to said garment hanger to prevent removal from the store premises without permission.

10. A device of claim 9 wherein said garment housing of the hanger is made of plastic.

11. A device of claim 9 wherein said garment housing of the hanger is made of metal.

12. A device of claim 11 wherein a pressure sensitive switch means for activating said electronic circuit of sound emitting means is mounted to said garment hanger.

13. A device according to claim 10 wherein a pressure sensitive switch means for activating said electronic circuit of sound emitting means is mounted to said garment hanger.

* * * * *